US007881255B1

(12) United States Patent
Bennett et al.

(10) Patent No.: US 7,881,255 B1
(45) Date of Patent: Feb. 1, 2011

(54) SYSTEMS AND METHODS FOR RELATING NETWORK TRAFFIC USING TRAFFIC-BASED SIGNATURES

(75) Inventors: Victor Bennett, Berkeley, CA (US); Sasank Mudunuri, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/754,171

(22) Filed: Apr. 5, 2010

Related U.S. Application Data (63) Continuation-in-part of application No. 10/952,449, filed on Sep. 29, 2004, now abandoned.

(51) Int. Cl.
*H04W 4/00* (2009.01)

(52) U.S. Cl. .................. 370/328; 370/310; 370/389; 370/395.3; 709/201; 709/203; 726/1; 726/3; 726/8

(58) Field of Classification Search ............... 370/310, 370/328, 389, 395.3, 423; 709/201–203; 726/1–3, 6–8
See application file for complete search history.

(56) References Cited

U.S. PATENT DOCUMENTS

| | | | | |
|---|---|---|---|---|
| 5,497,486 A * | 3/1996 | Stolfo et al. | ...................... | 1/1 |
| 5,796,952 A * | 8/1998 | Davis et al. | .................. | 709/224 |
| 5,948,061 A * | 9/1999 | Merriman et al. | ........... | 709/219 |
| 5,991,735 A * | 11/1999 | Gerace | ......................... | 705/10 |
| 6,018,619 A * | 1/2000 | Allard et al. | ................ | 709/224 |
| 6,038,574 A * | 3/2000 | Pitkow et al. | ................ | 715/210 |
| 6,393,407 B1 * | 5/2002 | Middleton et al. | ....... | 705/14.73 |
| 6,446,200 B1 * | 9/2002 | Ball et al. | ..................... | 713/1 |
| 6,463,474 B1 * | 10/2002 | Fuh et al. | ..................... | 709/225 |
| 6,466,578 B1 * | 10/2002 | Mauger et al. | ........... | 370/395.3 |
| 6,625,624 B1 * | 9/2003 | Chen et al. | ........................ | 1/1 |
| 6,701,362 B1 * | 3/2004 | Subramonian et al. | ...... | 709/224 |
| 6,792,458 B1 * | 9/2004 | Muret et al. | ................ | 709/224 |
| 6,965,881 B1 * | 11/2005 | Brickell et al. | ................ | 705/76 |
| 6,983,379 B1 * | 1/2006 | Spalink et al. | ................ | 705/10 |
| 7,020,622 B1 * | 3/2006 | Messer | ........................ | 705/26 |
| 7,076,479 B1 * | 7/2006 | Cheung et al. | ............. | 707/735 |
| 7,136,875 B2 * | 11/2006 | Anderson et al. | .................. | 1/1 |
| 7,359,962 B2 * | 4/2008 | Willebeek-LeMair et al. | .......................... | 709/223 |
| 7,469,139 B2 * | 12/2008 | van de Groenendaal | ..... | 455/411 |
| 2001/0027412 A1 * | 10/2001 | Son | .............................. | 705/14 |
| 2002/0191015 A1 * | 12/2002 | Brown et al. | ................ | 345/738 |
| 2004/0117654 A1 * | 6/2004 | Feldman et al. | ............. | 713/201 |
| 2005/0210027 A1 * | 9/2005 | Aggarwal et al. | .............. | 707/6 |

OTHER PUBLICATIONS

Johnny Chen et al.; U.S. Appl. No. 10/878,653; "Systems and Methods for Determining Advertising Activity"; filed Jun. 29, 2004; 42 pages.
Bennett et al., Co-pending U.S. Appl. No. 10/952,449; "Systems and Methods For Relating Network Traffic Using Traffic-Based Signatures"; filed Sep. 29, 2004; 35 pages.

* cited by examiner

*Primary Examiner*—Aung S Moe
*Assistant Examiner*—Benjamin Elliott
(74) *Attorney, Agent, or Firm*—Harrity & Harrity, LLP (57) ABSTRACT

A system includes multiple logging units, an aggregating unit, and an evaluation unit. The logging unit logs traffic attributes associated with network traffic received at multiple network nodes and generates traffic signatures using the received attributes. The aggregating unit aggregates the traffic signatures generated at the multiple logging units. The evaluating unit determines relationships among the network traffic or between the plurality of network nodes using the aggregated traffic signatures.

25 Claims, 9 Drawing Sheets

SYSTEMS AND METHODS FOR RELATING NETWORK TRAFFIC USING TRAFFIC-BASED SIGNATURES

RELATED APPLICATION

The present application is a continuation-in-part of U.S. patent application Ser. No. 10/952,449 filed Sep. 29, 2004.

BACKGROUND

1. Field of the Invention

Systems and methods consistent with the principles of the invention relate generally to detecting network traffic and, more particularly, to relating network traffic using traffic signatures.

2. Description of Related Art

The advent of the global Internet has given users throughout the world the capability to quickly and easily access and retrieve information stored at remote locations. Through the Internet, users may access, via laptop or desktop computers at their home or business, documents stored anywhere in the world. Some Internet users, however, may attempt to use the distributed connectivity of the Internet to engage in illicit network activity. In the case of an Internet service, such as, for example, an advertisement publishing service, in which a server hosts advertisement documents and receives earnings based on a number of times advertisement documents have been accessed, some users may attempt to create multiple accounts so as to appear as multiple actors when accessing documents hosted by such a service and, thus, inflating advertising revenue. Use of these multiple accounts can permit the user to have a significant aggregate effect (for example, generating a great deal of traffic or advertisement earnings) while disguising their traffic as originating from many users. Detection of illicit activity of this type can be difficult, or even impossible, with existing techniques.

SUMMARY

According to one aspect consistent with the principles of the invention, a method may include receiving attributes associated with network traffic logged at multiple network nodes and generating traffic signatures using the received attributes. The method may further include determining relationships between the multiple network nodes or among the network traffic using the generated traffic signatures.

According to another aspect, a method may include logging traffic attributes associated with the traffic received at a network node. The method may further include determining a traffic value associated with each traffic attribute, where the traffic value includes a number of times a respective user visited a document stored at the network node. The method may also include generating a signature data object that includes the traffic attributes and associated traffic values.

According to a further aspect, a method may include receiving traffic signatures, where the traffic signatures include network addresses associated with clients that have accessed documents stored at multiple network nodes and a number of times each respective client accessed the documents. The method may further include determining relationships between the multiple network nodes or among the network traffic using the received traffic signatures.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

A "document," as the term is used herein, is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link" as the term is used here, is to be broadly interpreted to include any reference to or from a document.

Exemplary Overview

Figure 1:
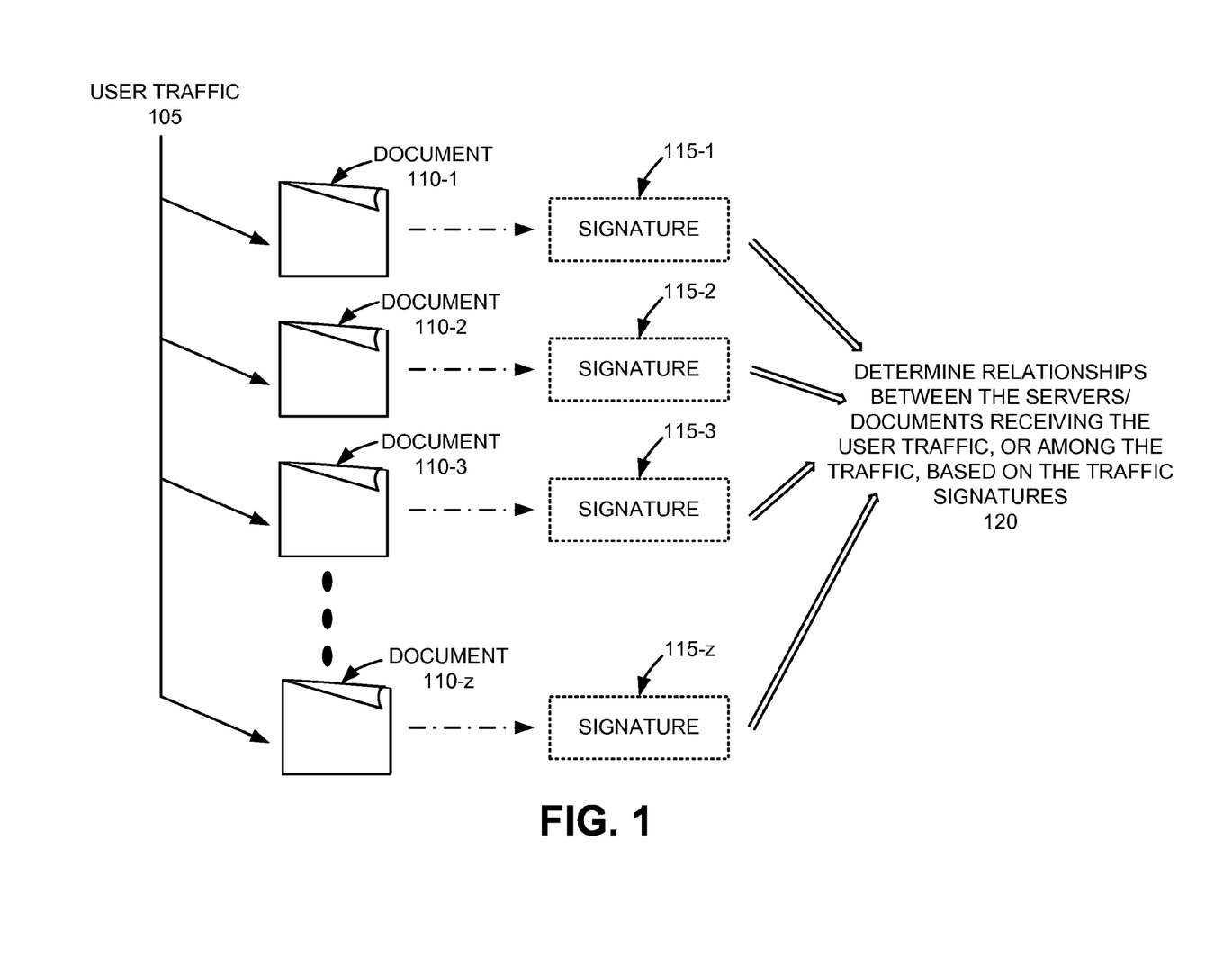
FIG. 1 is a diagram of an overview of an exemplary aspect of the invention.

FIG. 1 illustrates an overview of an exemplary aspect of the invention in which signatures, associated with network traffic corresponding to user access of documents stored at servers in a network, are used to determine relationships between the servers or among the network traffic received at the servers. As shown in FIG. 1, user traffic 105 may attempt to access documents 110-1 through 110-z stored at one or more locations in a network, such as, for example, at one or more servers. Documents 110-1 through 110-z may include documents containing any type of data. In one implementation, for example, documents 110-1 through 110-z may include data advertising products or services.

One or more traffic attributes, associated with each attempt to access a document 110, may be logged and a "signature" can then be generated that represents a "profile" of traffic behavior. Each signature may correspond to a set of traffic attributes associated with traffic encountered by a document, or a server hosting multiple documents, where the traffic originates from users attempting to access a document. In one exemplary implementation, a network address, associated with each user attempting to access a document, may be logged. In this implementation, an array of network addresses may be used to generate a "signature" of the traffic behavior. FIG. 1 depicts a different signature 115-1 through 115-z generated for each accessed document 110. In other implementations, however, a signature 115 may only be generated for each server storing documents 110. For example, server A, storing documents B, C and D may log one or more traffic attributes associated with each attempt to access any of documents B, C and D. The logged traffic attributes may then be used to generate a traffic signature that represents a profile of traffic behavior at server A. In other implementations, different traffic attributes may be used to generate a signature that represents a profile of traffic behavior. For example, an identifier associated with a user (i.e., user login), a country of origin of the user, or any other type of traffic attribute may be used to generate the signature.

The generated traffic-based signatures 115-1 through 115-z may be used to determine 120 relationships between the servers receiving the user traffic, or relationships among the traffic, based on the traffic signatures. In one implementation, for example, if network addresses are used as traffic attributes for generating traffic signatures, then a "K-means" technique may be used to cluster the traffic signatures. In such an implementation, a dataset, represented as a point in n dimensional space where n is the number of unique network addresses in the set of all network addresses that attempt to access documents at multiple servers, may be used for clustering to determine relationships between the multiple servers, or among the traffic received at the multiple servers.

Exemplary Network Configuration

Figure 2:
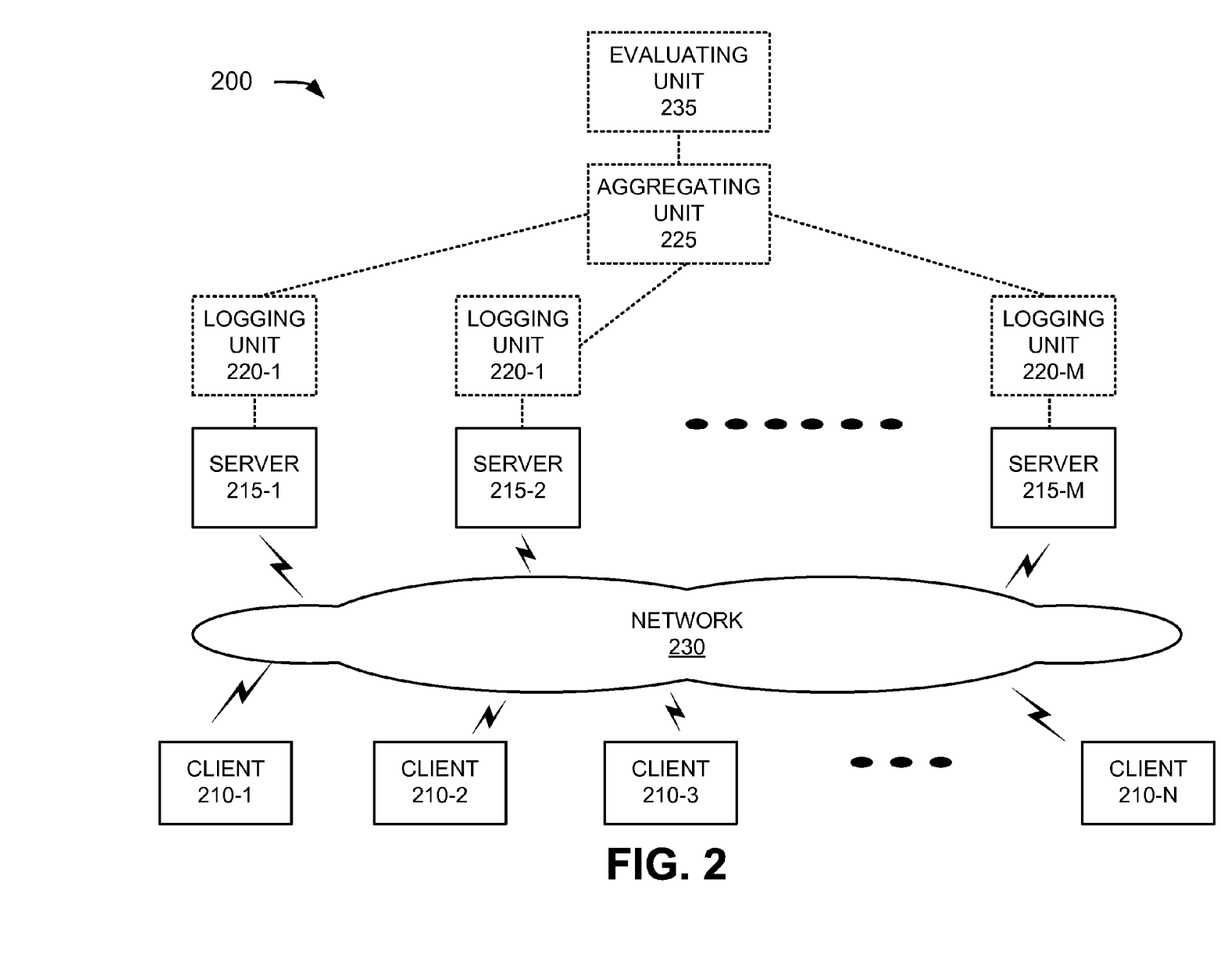
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210-1 through 210-N connected to multiple servers 215-1 through 215-M via a network 230. A logging unit 220 may be associated with each respective server 215 and an aggregating unit 225 may communicate with multiple logging units 220-1 through 220-M. An evaluating unit 235 may communicate with aggregating unit 225.

Network 230 may include a local area network (LAN), a wide area network (WAN), a telephone network, such as the Public Switched Telephone Network (PSTN), an intranet, the Internet, a memory device, another type of network, or a combination of networks. More, or fewer, clients and servers may connect to network 230 than shown in FIG. 2. Also, in some instances, a client may perform the functions of a server and a server may perform the functions of a client.

Clients 210 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Clients 210 and servers 215 may connect to network 230 via wired, wireless, and/or optical connections.

Each server 215 may include a server entity that may store or maintain documents that may be accessed by clients 210. Such documents may include data related to published news stories, products, images, user groups, geographic areas, or any other type of data. For example, a server 215 may store or maintain news stories from any type of news source, such as, for example, the Washington Post, the New York Times, Time magazine, or Newsweek. As another example, a server 215 may store or maintain data related to specific product data, such as product data provided by one or more product manufacturers. As yet another example, a server 215 may store or maintain data related to other types of web documents, such as pages of web sites.

Each server 215 may be associated with a logging unit 220. Each logging unit 220 may log a traffic attribute associated with each attempt by a client 210 to access data stored at a respective server 215. In one implementation, for example, each logging unit 220 may store a network address of each client 210 that attempts to access data stored at a respective server 215. In one implementation, for example, the network address may include an Internet Protocol (IP) address. Logging unit 220 may be internal, or external, to server 215 and may be implemented in software or hardware.

Each logging unit 220 may generate local traffic signatures, based on the logged traffic attributes, and send the local traffic signatures to aggregating unit 225. Each local traffic signature may be associated with a respective document, or server 215, that was accessed by users of one or more clients 210. For example, a traffic signature may be created using traffic attributes associated with attempts by multiple clients 210 to access a document A stored at server S1. The generated traffic signature may be associated with either document A, or with server S1.

Aggregating unit 225 may aggregate the local traffic signatures received from logging units 220 and generate global traffic signatures. The global traffic signatures may be generated using the local traffic signatures received from multiple logging units 220-1 through 220-M. For example, a global traffic signature may be created, using local traffic signatures received from logging units 220-1 through 220-M and associated with either document B, or with server S2 that stores document B.

As shown in FIG. 2, logging units 220, aggregating unit 225 and evaluating unit 235 are depicted as separate entities. In other implementations, however, one or more of logging units 220-1 through 220-M may be implemented with aggregating unit 225 and/or evaluating unit 235 as a single entity. In further implementations, aggregating 225 and evaluating unit 235 may be implemented at one of servers 215-1 through 215-M. Logging units 220, aggregating unit 225 and evaluating unit 235 may be implemented in either software of hardware.

Exemplary Client/Server Architecture

Figure 3:
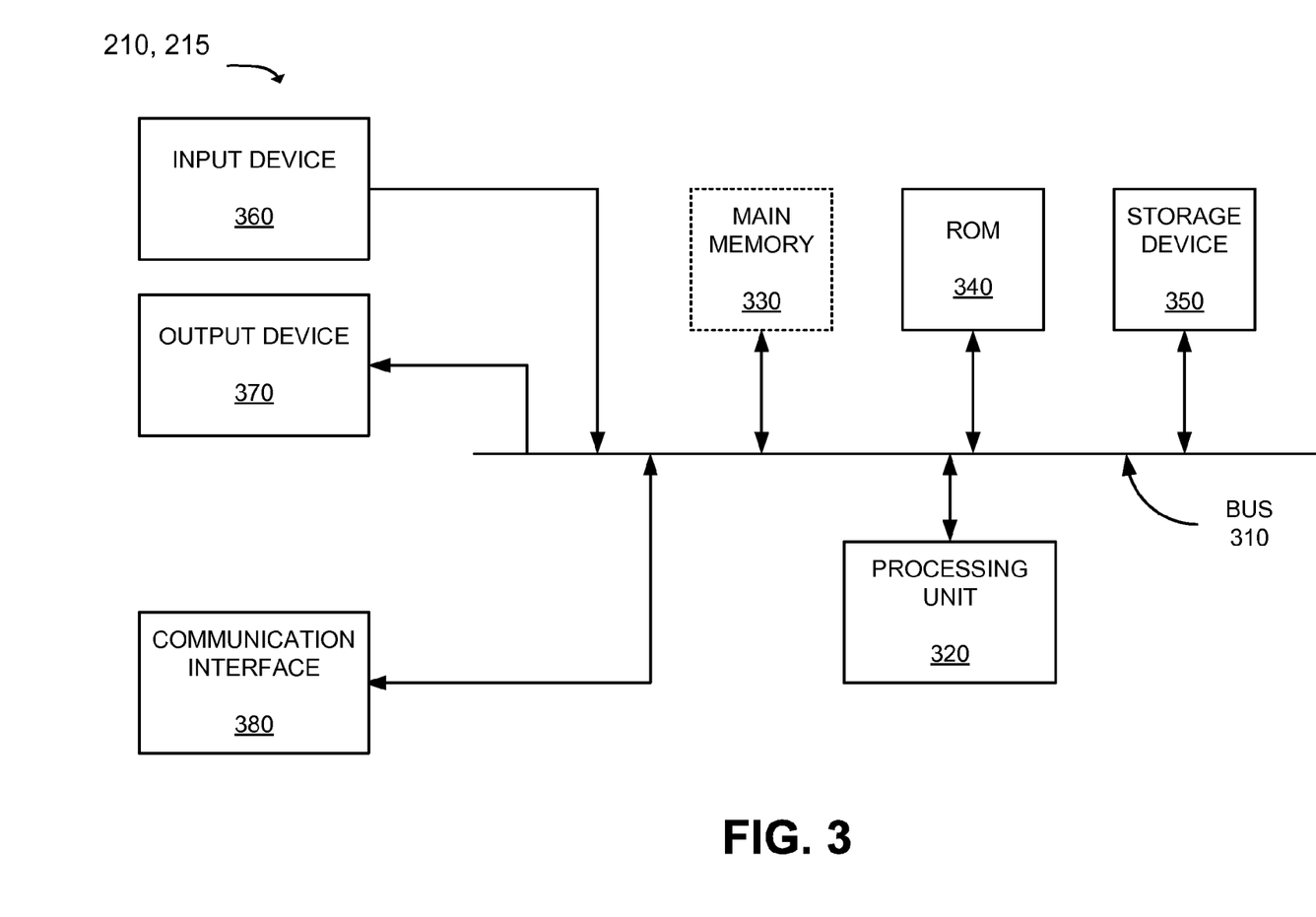
FIG. 3 is an exemplary diagram of a client and/or server of FIG. 2 in an implementation consistent with the principles of the invention.

FIG. 3 is an exemplary diagram of a client or server entity (hereinafter called "client/server entity"), which may correspond to one or more of clients 210 and servers 215, according to an implementation consistent with the principles of the invention. The client/server entity may include a bus 310, a processing unit 320, an optional main memory 330, a read only memory (ROM) 340, a storage device 350, an input device 360, an output device 370, and a communication interface 380. Bus 310 may include a path that permits communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or other biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain document storage and/or document access-related operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Local Traffic Signature

Figure 4:
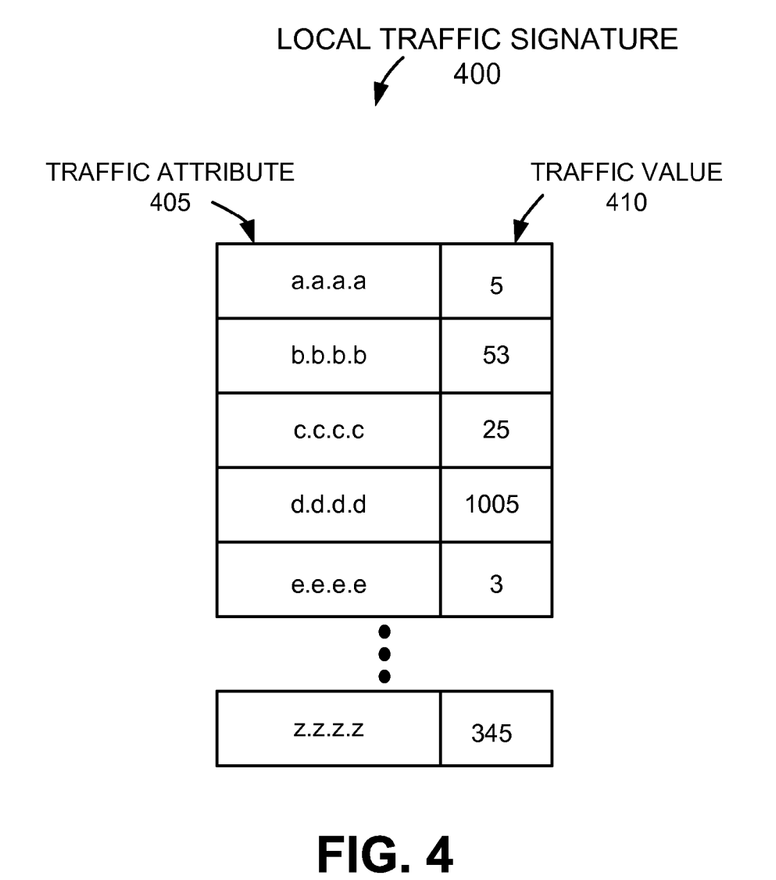
FIG. 4 is a diagram of an exemplary local traffic signature consistent with principles of the invention.

FIG. 4 is a diagram illustrating an exemplary local traffic signature 400 generated by a logging unit 220 consistent with principles of the invention. Local traffic signature 400 may be stored in a memory associated with a logging unit 220. Traffic signature 400 may include multiple traffic attributes 405 and corresponding traffic values 410. Each traffic attribute 405 may include an attribute associated with the behavior of traffic received at a server 215. Each traffic attribute 405 may be derived from any type of identifying information associated with a user attempting to access one or more documents. In one implementation, for example, each traffic attribute 405 may include an IP address associated with a client 210 that attempts to access a document stored at a server 215, and traffic value 410 may include a number of times that the client 210 associated with the IP address has attempted to access the document. In other implementations, however, traffic attribute 405 may include any type of traffic attribute, such as, for example, a country of origin of the client attempting to access documents, or an explicit declaration by a "browser" at a client 210 identifying the user attempting to access the documents. In a further implementation, traffic attribute 405 may include any combination of different traffic attributes. In additional embodiments, each traffic value 410 may include a weighted average of a number of times that the client 210 associated with the IP address attempted to access a document over a time period.

Exemplary Global Traffic Signature

Figure 5:
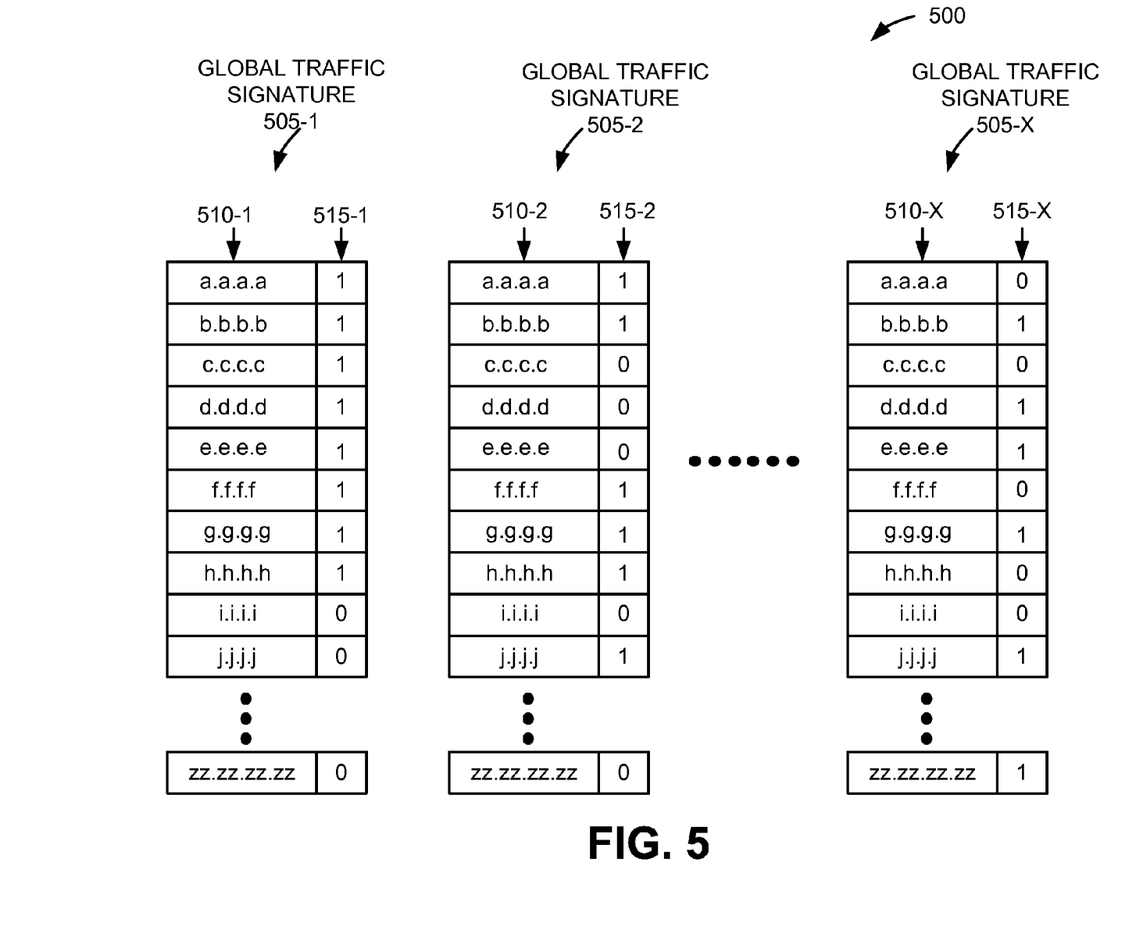
FIG. 5 is a diagram of global traffic signatures consistent with principles of the invention.

FIG. 5 is a diagram illustrating exemplary global traffic signatures 500 generated by aggregating unit 225 consistent with principles of the invention. Global traffic signatures 500 may be stored in a memory associated with aggregating unit 225. Global traffic signatures 500 may include multiple traffic signatures 505-1 through 505-X, with each signature 505 including multiple traffic attributes 510 and traffic values 515. In one implementation, a traffic attribute 510 may include an IP address associated with a client 210 that attempts to access a document stored at a server 215, and a traffic value 515 may indicate whether the client associated with the IP address accessed a document from a respective server 215. Each signature 505 may be associated with a document stored at a respective server 215, or with the server 215 itself.

Exemplary Traffic Attribute Logging Process

Figure 6:
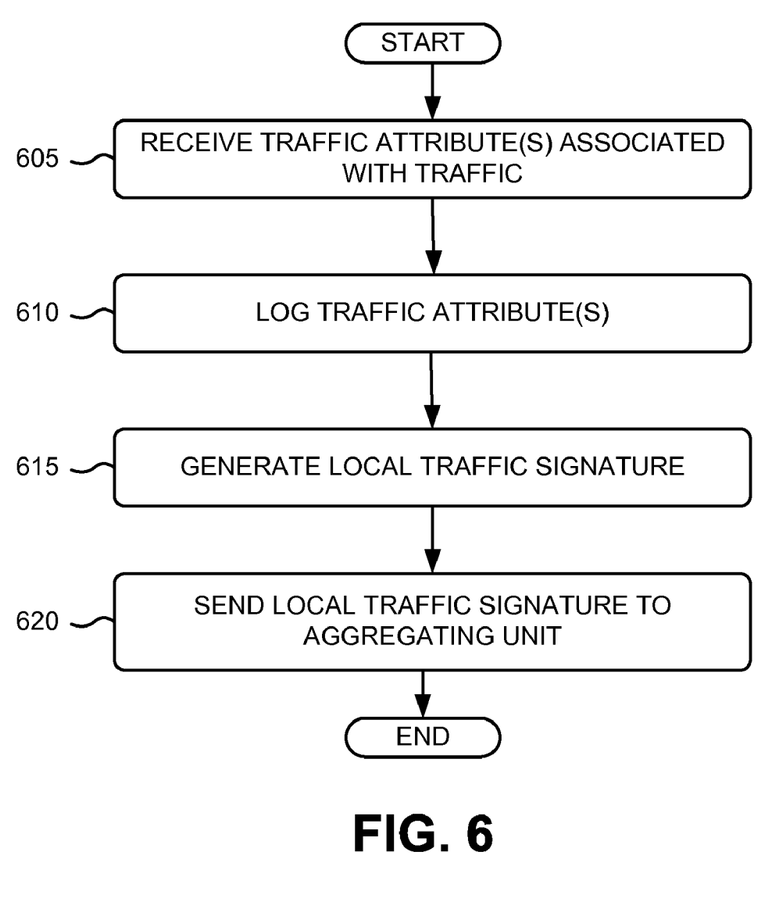
FIG. 6 is a flowchart of an exemplary process for logging traffic attributes and generating traffic signatures consistent with principles of the invention.

FIG. 6 is a flowchart of an exemplary process for logging traffic attributes associated with traffic received at a server 215 according to an implementation consistent with the principles of the invention. As one skilled in the art will appreciate, the processing exemplified by FIG. 6 can be implemented in software or hardware in a server 215 and/or a respective logging unit 220.

The exemplary process may begin with the receipt of one or more traffic attributes associated with traffic received at server 215 (act 605). Users at clients 210 may send traffic attempting to access documents stored at one or more of servers 215. Each server 215 receiving such traffic may record a traffic attribute associated with each attempt to access a document. In one implementation, each server 215 may record network addresses (e.g., IP addresses) associated with each client 210 from which traffic originated. Server 215 may send the recorded traffic attribute to a corresponding logging unit 220.

The received traffic attribute(s) may be logged at logging unit 220 (act 610). A logging unit 220 that receives a traffic attribute from server 215 may "log" the attribute by storing it in a traffic attribute entry 405 of traffic signature 400. A local traffic signature may be generated (act 615). To generate the local traffic-based signature, a traffic value 410 may be associated with each traffic attribute 405. In one implementation, traffic value 410 may include a number of times that a client 210, that originated the traffic associated with a corresponding traffic attribute 405, attempted to access a document stored at server 215. Each traffic attribute 405 and traffic value 410 may be stored as part of an array to generate traffic signature 400. The local traffic signature may then be sent to aggregating unit 225 (act 620).

Exemplary Traffic Signature Aggregation Process

Figure 7:
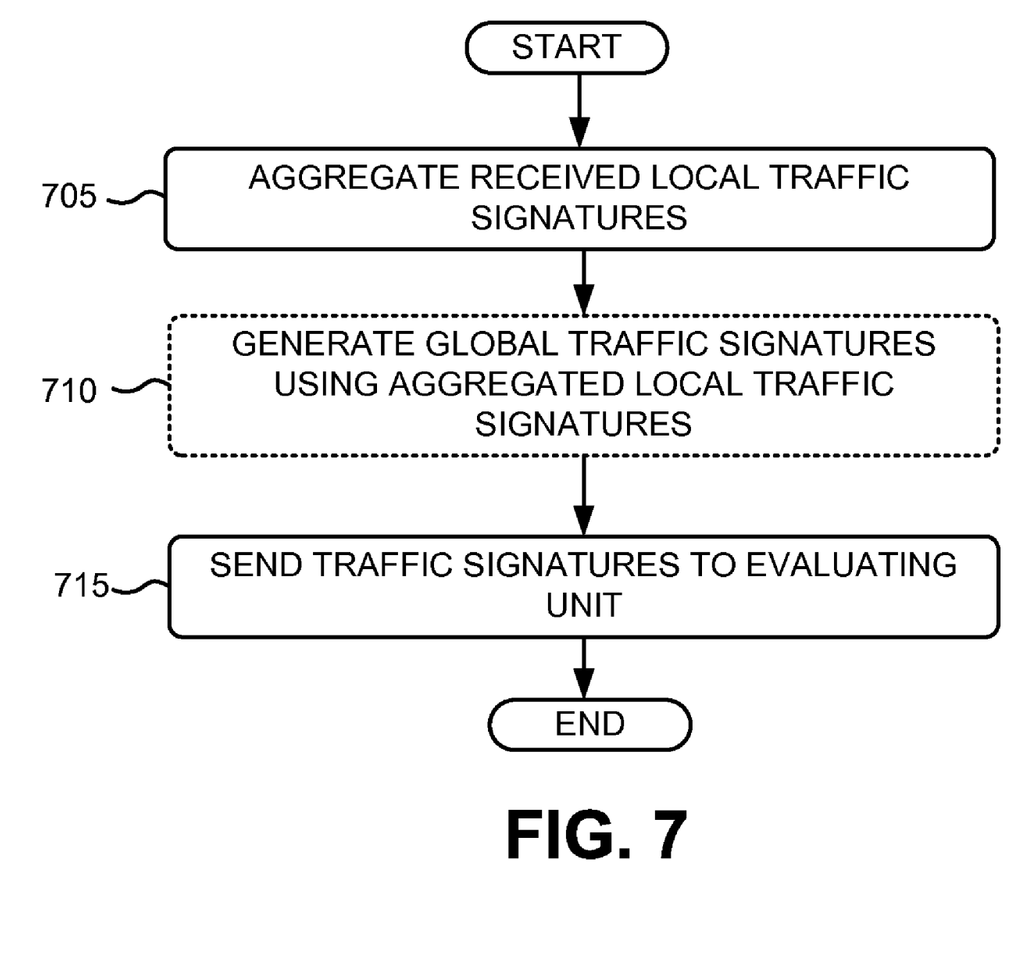
FIG. 7 is a flowchart of an exemplary process for aggregating traffic signatures consistent with principles of the invention.

FIG. 7 is a flowchart of an exemplary process for aggregating traffic signatures received from logging units 220-1 through 220-M consistent with the principles of the invention. As one skilled in the art will appreciate, the process exemplified by FIG. 7 can be implemented in software or hardware in aggregating unit 220.

The exemplary process may begin with the aggregation of local traffic signatures 400 received from logging units 220-1 through 220-M (act 705). The local traffic signatures may be aggregated by storing as respective data objects in a memory associated with aggregating unit 220. Optionally, global traffic signatures 500 may be generated, corresponding to a respective document or server 215, using the received local traffic signatures (act 710). A global list of traffic attributes 510 may be generated for each document or server from which aggregating unit 225 received a local traffic signature. A traffic value 515 may be associated with each traffic attribute 510 and may indicate whether the client associated with the traffic attribute 510 accessed a document from a respective server 215. For example, a "1" value in traffic value 515 may indicate that a client associated with traffic attribute 510 did originate traffic to the document or server 215 that corresponds to signature 505. A "0" value in traffic value 515 may indicate that a client associated with traffic attribute 510 did not originate traffic to the document or server 215 that corresponds to signature 505. As shown in the illustrative example of FIG. 5, a global traffic signature 505 may include a list of traffic attributes 510 associated with every client that originated traffic sent to any of the servers 215 that communicate with aggregating unit 225.

The traffic signatures may then be sent to evaluating unit 235 for evaluation (act 715). The traffic signatures sent to evaluating unit 235 may include local traffic signatures 400 received from logging units 220 and/or global traffic signatures 500 generated at aggregating unit 225.

Exemplary Signature Evaluation Process

Figure 8:
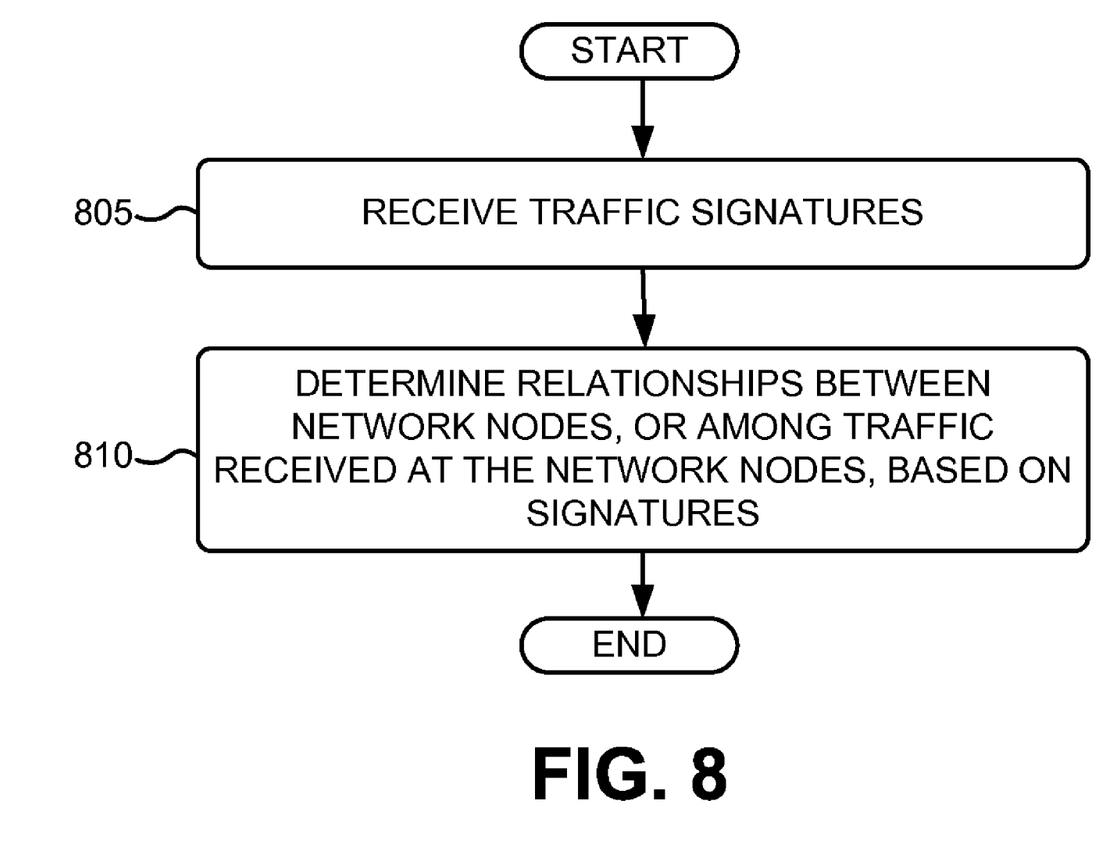
FIG. 8 is a flowchart of an exemplary process for determining relationships between/among traffic or network nodes using aggregated traffic signatures.

FIG. 8 is a flowchart of an exemplary process for determining relationships between network nodes, or among traffic received at the network nodes, consistent with the principles of the invention. As one skilled in the art will appreciate, the processing exemplified by FIG. 8 can be implemented in software or hardware in evaluating unit 235.

The exemplary process may begin with the receipt of traffic signatures from aggregating unit 225 (act 805). The received traffic signatures may include local traffic signatures generated at logging units 220 or global traffic signatures generated at aggregating unit 225. Relationships between network nodes, or among traffic received at the network nodes, may then be determined based on the traffic signatures (act 810). Various techniques may be used to determine relationships between the network nodes, or among traffic received at the network nodes, based on the traffic-based signatures. Existing clustering algorithms, for example, may determine relationships, whether through actual interaction or similar circumstances, between the network nodes, or among traffic received at the network nodes.

In one clustering implementation, in which the traffic attributes include IP addresses, a "K-means" technique may be used in which each IP address x.x.x.x represents a point in N-dimensional space (wherein N is a number of unique IP addresses in the set of all IP addresses from which traffic originated) with each point's ordinate including, for example, a number of times a respective IP address attempted to access a document at a server 215. As a simplified example of performing a "K-means" technique, assume that you have a group of cities, including a list of their names and their longitude and latitude. The longitude and latitude may be used as coordinates in a two dimensional plane. Arbitrary midpoints between the group of cities may be selected, such as, for example, Topeka, Kansas and Moscow, Russia. A distance may then be calculated between each city and each midpoint, and each city may be assigned a type of the nearer midpoint. For example, Mexico City could be of type Kansas and London England could be of type Moscow. Then a midpoint of all of the cities assigned the type Kansas may be found and the type Kansas may be discarded. The process may be repeated until the cities are divided into two clusters that are close to each other. The above simplified process may be similarly applied to IP addresses in N dimensions, instead of two dimensions, where each IP address includes a point in the N dimensions.

In another implementation, transitive closure may be applied to find one or more servers that receive traffic from a given IP address and to determine if there are any closed "circles" of IP addresses that each affect the traffic of other IP addresses.

Clustering based on a traffic signature may succeed at suggesting not only clusters of document publishers that are related, but also those that receive similar traffic. Clustering may further determine a strata of sizes of audiences (i.e., widely read versus targeted, or accounts serving a language used by tens of thousands of users versus a language used by millions). Clustering may also determine accounts with similar structures, such as, for example, forums versus news sites. Clustering may additionally determine accounts using a similar automated approach to generate illicit traffic.

Clustering may suggest similarities in traffic. If servers are receiving legitimate traffic, then it is possible that the servers attract a similar audience, or are somehow affiliated. Clustering may also suggest that servers are linked, with traffic proceeding from one server to another. Clustering may further suggest that, if one of the servers is receiving illicit traffic, then other servers in a same cluster may be receiving similar illicit traffic.

Exemplary Implementation

Figure 9:
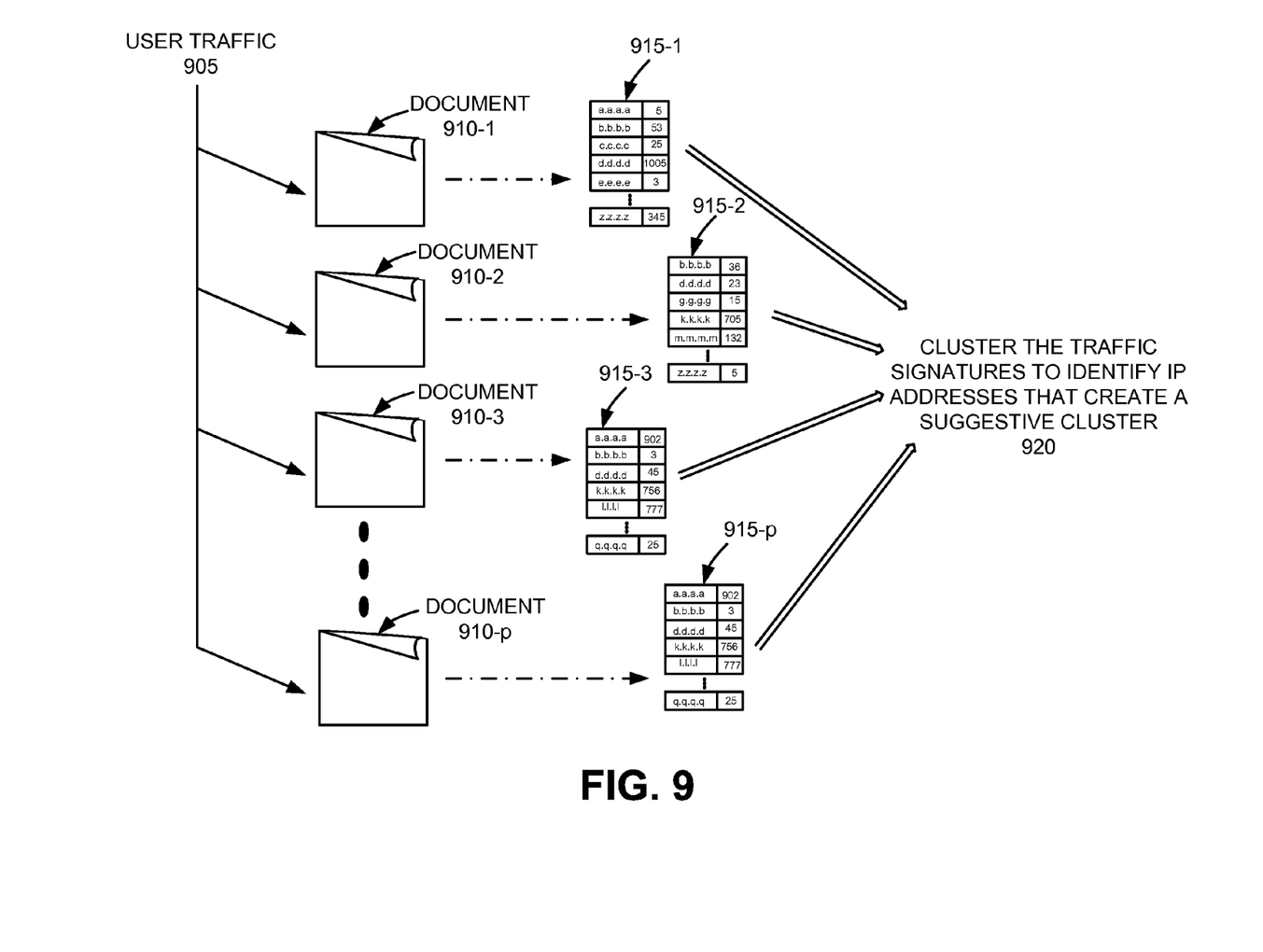
FIG. 9 is a diagram of an overview of an exemplary aspect of the invention that clusters traffic signatures to identify network addresses that create suggestive clusters.

FIG. 9 illustrates an exemplary implementation in which traffic signatures, associated with network traffic corresponding to users' access of documents stored at servers in a network, are used to identify network addresses associated with users that create suggestive clusters. As shown in FIG. 9, user traffic 905 may attempt to access documents 910-1 through 910-p stored at one or more locations in a network, such as, for example, at one or more servers. Documents 910-1 through 910-p may include, for example, data advertising products or services. One or more IP addresses, associated with each client that attempts to access a document 910, may be logged and a "signature" 915 can then be generated that represents a "profile" of traffic behavior. Each signature 915, for example, may include an array of IP addresses. FIG. 9 depicts a different signature 915-1 through 915-p generated for each accessed document 910. In other implementations, however, a signature 915 may only be generated for each server storing documents 910. For example, server Z, storing documents E, F and G may log one or more IP addresses associated with each attempt to access any of documents E, F and G. The logged IP addresses may then be used to generate a traffic signature that represents a profile of traffic behavior at server Z.

The generated traffic-based signatures 915-1 through 915-p may be clustered 920 to identify IP addresses that create clusters suggestive of certain relationships between the IP addresses, or between the IP addresses and the servers from which documents 910 were accessed. Any clustering technique, including those describe above, may be used to determine relationships between the IP addresses, or between the IP addresses and the servers.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 6-8, the order of the acts may be modified in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein. Further, certain portions of the invention have been described as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, comprising:
    receiving, via at least one server device of the one or more server devices, attributes associated with network traffic logged at a plurality of network nodes;
    generating, via at least one server device of the one or more server devices, traffic signatures using the received attributes;
    determining, via at least one server device of the one or more server devices, relationships between the plurality of network nodes or among the network traffic using the generated traffic signatures, where determining the relationships includes:
        clustering the generated traffic signatures to determine the relationships between the plurality of network nodes or among the network traffic, and
        determining clusters of the plurality of network nodes that are related using the clustered traffic signatures, where determining the clusters includes determining, based on the relationships, one or more of the plurality of network nodes that receive traffic from a common source;
    determining, via at least one server device of the one or more server devices, a common traffic value comprising a number of times the common source visited a document stored at one of the plurality of network nodes; and
    storing, via at least one server device of the one or more server devices, the common traffic value.

2. The method of claim 1, where each of the attributes comprises a network address associated with the respective user.

3. The method of claim 1, where each network address comprises an Internet Protocol (IP) address.

4. The method of claim 1, where each of the attributes further comprises a country of origin associated with the network traffic.

5. The method of claim 1, where each of the attributes comprises an identifier that corresponds to a respective user transmitting traffic of the network traffic.

6. The method of claim 5, where the identifier originates from a browser application implemented at a client from which the respective user transmits the traffic.

7. The method of claim 5, where the identifier corresponds to a signature associated with a browser application implemented at a client from which the respective user transmits the traffic.

8. The method of claim 1, where determining the relationships comprises:
    using transitive closure to determine one or more of the plurality of network nodes that receive traffic from a given network address.

9. The method of claim 1, further comprising:
    receiving traffic values, corresponding to each received attribute, associated with the network traffic logged at the plurality of network nodes, where the common traffic value is based on the received traffic values.

10. The method of claim 9, where the attributes comprise network addresses associated with each user transmitting traffic of the network traffic, and where the traffic values comprise a number of times a respective user accesses a document stored at a respective one of the plurality of network nodes.

11. The method of claim 1, where clustering the generated traffic signatures comprises:
    determining clusters of the plurality of network nodes that receive similar traffic using the traffic signatures.

12. The method of claim 1, where determining the relationships comprises:
    determining sizes of audiences associated with content stored at each of the plurality of network nodes using the traffic signatures.

13. The method of claim 1, where determining the relationships comprises:
    determining sources of illicit traffic using the traffic signatures.

14. A system, comprising:
    a plurality of logging units to:
        log traffic attributes associated with network traffic received at a plurality of network nodes, and
        generate traffic signatures using the received attributes;
    an aggregating unit to aggregate the traffic signatures generated at the plurality of logging units; and
    an evaluation unit to determine relationships between the plurality of network nodes or among the network traffic using the aggregated traffic signatures, where the evaluation unit, when determining the relationships, is further to:
        cluster the generated traffic signatures to determine the relationships between the plurality of network nodes or among the network traffic, and
        determine clusters of the plurality of network nodes that are related using the clustered traffic signatures, where the evaluation unit, when determining the clusters, is further to determine, based on the relationships, one or more of the plurality of network nodes that receive traffic from a common source.

15. The system of claim 14, where the traffic signatures comprise network addresses associated with each user transmitting traffic of the network traffic and a number of times a respective user accessed a document stored at a respective one of the plurality of network nodes.

16. A method, comprising:
    receiving, via at least one server device of one or more server devices, traffic signatures, where the traffic signatures comprise network addresses associated with clients that have accessed documents stored at a plurality of network nodes and a number of times each respective client accessed the documents; and
    determining, via at least one server device of the one or more server devices, relationships between the plurality of network nodes or among the network traffic using the received traffic signatures, where determining the relationships includes:
        clustering the traffic signatures to determine the relationships between the plurality of network nodes or among the network traffic, and
        determining clusters of the plurality of network nodes that are related using the clustered traffic signatures, where determining the clusters includes determining, based on the relationships, one or more of the plurality of network nodes that receive traffic from a common source.

17. The method of claim 16, where determining the relationships comprises:
    using transitive closure to determine one or more of the plurality of network nodes that receive traffic from a given network address.

18. The method of claim 16, where clustering comprises:
    determining clusters of the plurality of network nodes that receive similar traffic using the traffic signatures.

19. The method of claim 16, where determining the relationships comprises:
    determining sizes of audiences associated with content stored at each of the plurality of network nodes using the traffic signatures.

20. The method of claim 16, where determining the relationships comprises:
    determining sources of illicit traffic using the traffic signatures.

21. One or more memory devices containing instructions to control at least one processor in one or more computer devices to perform a method, the method comprising:
    receiving traffic signatures, where the traffic signatures comprise network addresses associated with clients that have accessed documents stored at a plurality of network nodes and a number of times each respective client accessed the documents; and
    determining relationships between the plurality of network nodes using the received traffic signatures, where determining the relationships includes:
        clustering the traffic signatures to determine the relationships between the plurality of network nodes or among the network traffic, and
        determining clusters of the plurality of network nodes that are related using the clustered traffic signatures, where determining the clusters includes determining, based on the relationships, one or more of the plurality of network nodes that receive traffic from a common source.

22. The one or more memory devices of claim 21, where each of the network addresses comprises an Internet Protocol (IP) address.

23. The method of claim 22, where clustering the generated traffic signatures comprises:
    determining clusters of the plurality of network nodes that receive similar traffic using the traffic signatures.

24. The one or more memory devices of claim 21, where clustering the generated traffic signatures comprises:
    determining clusters of the plurality of network nodes that receive similar traffic using the traffic signatures.

25. A method, comprising:
    receiving, via at least one server device of one or more server devices, Internet Protocol (IP) addresses associated with network traffic received at a plurality of network nodes, where the network traffic is associated with attempts by users to access documents stored at the plurality of network nodes;
    receiving, via at least one server device of the one or more server devices, traffic values that comprise a number of times respective users have attempted to access respective one of the documents stored at the plurality of network nodes;
    generating, via at least one server device of the one or more server devices, traffic signatures using the received IP addresses and traffic values;
    clustering, via the at least one server device, the generated traffic signatures to determine relationships between the plurality of network nodes or among the network traffic; and
    determining clusters of the plurality of network nodes that are related using the traffic signatures, where determining the clusters includes determining, based on the relationships, one or more of the plurality of network nodes that receive traffic from a common source.

* * * * *